US006788493B1

(12) United States Patent
Subramaniam et al.

(10) Patent No.: US 6,788,493 B1
(45) Date of Patent: Sep. 7, 2004

(54) DIFFUSER FOR REDUCING FLUID VELOCITY NEAR DISK SURFACES IN A ROTATING STORAGE DEVICE

(75) Inventors: Shankar Subramaniam, Shrewsbury, MA (US); Edward G. Acciardi, Grafton, MA (US); Roger Burhans, Worcester, MA (US); Travis Hein, Holliston, MA (US); Gary Walker, Sherborn, MA (US)

(73) Assignee: Maxtor Corporation, Longmont, CO (US)

( * ) Notice: Subject to any disclaimer, the term of this patent is extended or adjusted under 35 U.S.C. 154(b) by 22 days.

(21) Appl. No.: 10/316,417

(22) Filed: Dec. 10, 2002

Related U.S. Application Data (60) Provisional application No. 60/345,443, filed on Jan. 4, 2002.

(51) Int. Cl.[7] .............................................. G11B 17/02
(52) U.S. Cl. ................................. 360/97.02; 360/97.03
(58) Field of Search ............................ 360/97.02, 97.03

(56) References Cited

U.S. PATENT DOCUMENTS

| | | | |
|---|---|---|---|
| 5,231,549 A | | 7/1993 | Morehouse et al. |
| 6,097,568 A | | 8/2000 | Ekhoff |
| 6,496,327 B2 | | 12/2002 | Xia et al. |
| 6,542,328 B2 | * | 4/2003 | Harrison et al. ......... 360/97.03 |
| 6,545,842 B2 | * | 4/2003 | Rao et al. ................. 360/97.02 |
| 6,549,365 B1 | * | 4/2003 | Severson ................. 360/97.02 |

OTHER PUBLICATIONS

U.S. patent application Ser. No. 10/000,685, Harrison et al., filed Sep. 26, 2002.
U.S. patent application Ser. No. 10/022,260, Tokuyama et al., filed Jun. 20, 2002.

* cited by examiner

Primary Examiner—Robert S. Tupper
(74) Attorney, Agent, or Firm—James P. Broder; Steven G. Roeder (57) ABSTRACT

A disk drive includes a drive housing, one or more rotating storage disks, each having a storage surface, and a fluid diffuser. The fluid diffuser includes one or more stationary diffuser wings, each having a wing surface positioned near the storage surface. One or more of the diffuser wings can extend between two of the storage disks. The diffuser wing includes a surface deviation that disrupts the fluid flow over the wing surface that is caused by the rotating storage disk. The surface deviation can include an indentation in the wing surface or can extend from the wing surface toward the storage surface. In still another embodiment, the surface deviation includes an aperture that extends through the diffuser wing. Further, the fluid diffuser can include a plurality of surface deviations that are positioned along the wing surface. Further, a portion of the surface deviation can form an angle with the wing surface that is greater than approximately 0 degrees and less than approximately 180 degrees. With this design, the fluid diffuser decreases fluid velocity near the data transducers and/or the rotating storage disks.

51 Claims, 5 Drawing Sheets

DIFFUSER FOR REDUCING FLUID VELOCITY NEAR DISK SURFACES IN A ROTATING STORAGE DEVICE

RELATED APPLICATION

This Application claims the benefit on U.S. Provisional Application Serial No. 60/345,443 filed on Jan. 4, 2002. The contents of U.S. Provisional Application Serial No. 60/345,443 are incorporated herein by reference.

FIELD OF THE INVENTION

The present invention relates generally to disk drives for storing data. More specifically, the present invention relates to a fluid diffuser for a disk drive.

BACKGROUND

Disk drives are widely used in computers and data processing systems for storing information in digital form. These disk drives commonly use one or more rotating storage disks to store data. Each storage disk typically includes a data storage surface on each side of the storage disk. These storage surfaces are divided into a plurality of narrow, annular regions of different radii, commonly referred to as "tracks". Typically, a positioner is used to move an E-block and a transducer assembly having a data transducer over each data storage surface of the storage disk. The data transducer transfers information to and from the storage disk when positioned over a target track of the storage surface.

The need for increased storage capacity and compact construction of the disk drive has led to the use of storage disks having increased track density or decreased track pitch, i.e., more tracks per inch. As the tracks per inch increase, the ability to maintain the data transducer over the target track becomes more difficult. For example, disk drives in use today can require that the data transducer remain on the target track to within less than 1 millionth of an inch. Stated another way, as track density increases, it is necessary to reduce the positioning error of the data transducer proportionally. With these systems, the accurate and stable positioning of the data transducer is critical to the accurate transfer of data between the data transducer and the storage disk.

Moreover, the need for decreasing data transfer times has led to ever-increasing rotational velocities of the storage disks. However, as the storage disks rotate, air or other fluids in the spaces between adjacent storage disks is dragged along with the rotating disks and is accelerated outwardly and/or linearly toward the perimeter of the storage disks by centrifugal and/or centripetal forces. The accelerated fluid is propelled from the spaces between the storage disks, resulting in low-pressure regions between adjacent storage disks. Fluid rushes in at a relatively high velocity because of the pressure differential to fill the low-pressure regions. This repeated cycle causes chaotic and random flutter of the storage disks and high-velocity fluid flow between the storage disks. This high-energy fluid flow can cause the E-block and the transducer assemblies to vibrate and become excited. The vibration makes it more difficult to position and maintain the data transducer over the target track. The fluid flow becomes even more disruptive as the storage disks rotate more rapidly and are positioned increasingly closer together. The inability to maintain the data transducer over the target track is also referred to herein as track misregistration. Thus, the ability to avoid track misregistration is becoming more difficult.

Attempts to reduce track misregistration caused by high-energy fluid flow include positioning an air dam at various locations in the drive housing. A typical air dam attempts to block the majority of the flow of fluid to the E-block and the transducer assemblies. Unfortunately, existing air dams can create differential pressure regions that result in increased high-energy fluid flow near the transducer assemblies and the E-block.

In light of the above, the need exists to provide a reliable, simple, and efficient device that effectively decreases the velocity of fluid flow near the transducer assemblies. Another need exists to provide a disk drive with a reduced incidence of track misregistration that is relatively easy and cost effective to manufacture.

SUMMARY

The present invention is directed to a disk drive that includes a drive housing, a rotating first storage disk having a first storage surface, and a fluid diffuser. The rotating storage disk generates fluid flow within the drive housing. The fluid diffuser includes a first diffuser wing that is substantially stationary relative to the drive housing. The first diffuser wing has a first wing surface positioned near the first storage surface. The first diffuser wing includes one or more spaced-apart surface deviations that disrupt the fluid flow over the first wing surface. In one embodiment, the surface deviation is an indentation into the first wing surface of the first diffuser wing. In another embodiment, the surface deviation extends away from the first wing surface towards the first storage surface. In still another embodiment, the surface deviation is an aperture that extends through the first diffuser wing. Alternately, the first diffuser wing can include a combination of these surface deviations.

The disk drive can also include a rotating second storage disk. The first diffuser wing can be positioned substantially between the first storage disk and the second storage disk. Moreover, the fluid diffuser can include a plurality of diffuser wings that can be positioned substantially between the first storage disk and the second storage disk. The diffuser wings can divert the fluid flow substantially toward or away from the storage surfaces of the storage disks.

The present invention is also directed to a disk drive that includes a pair of spaced apart, rotating storage disks that each has a storage surface, and a fluid diffuser. In this embodiment, the diffuser wing has a wing surface, and is positioned between the storage surfaces of the storage disks. The diffuser wing includes a surface deviation that extends from the wing surface toward one of the storage surfaces. The wing surface can be substantially planar or can be curved. Further, a portion of the surface deviation can form an angle with the wing surface that is greater than approximately 0 degrees and less than approximately 180 degrees.

The present invention also includes a method for enhancing the accuracy and/or the reliability of a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
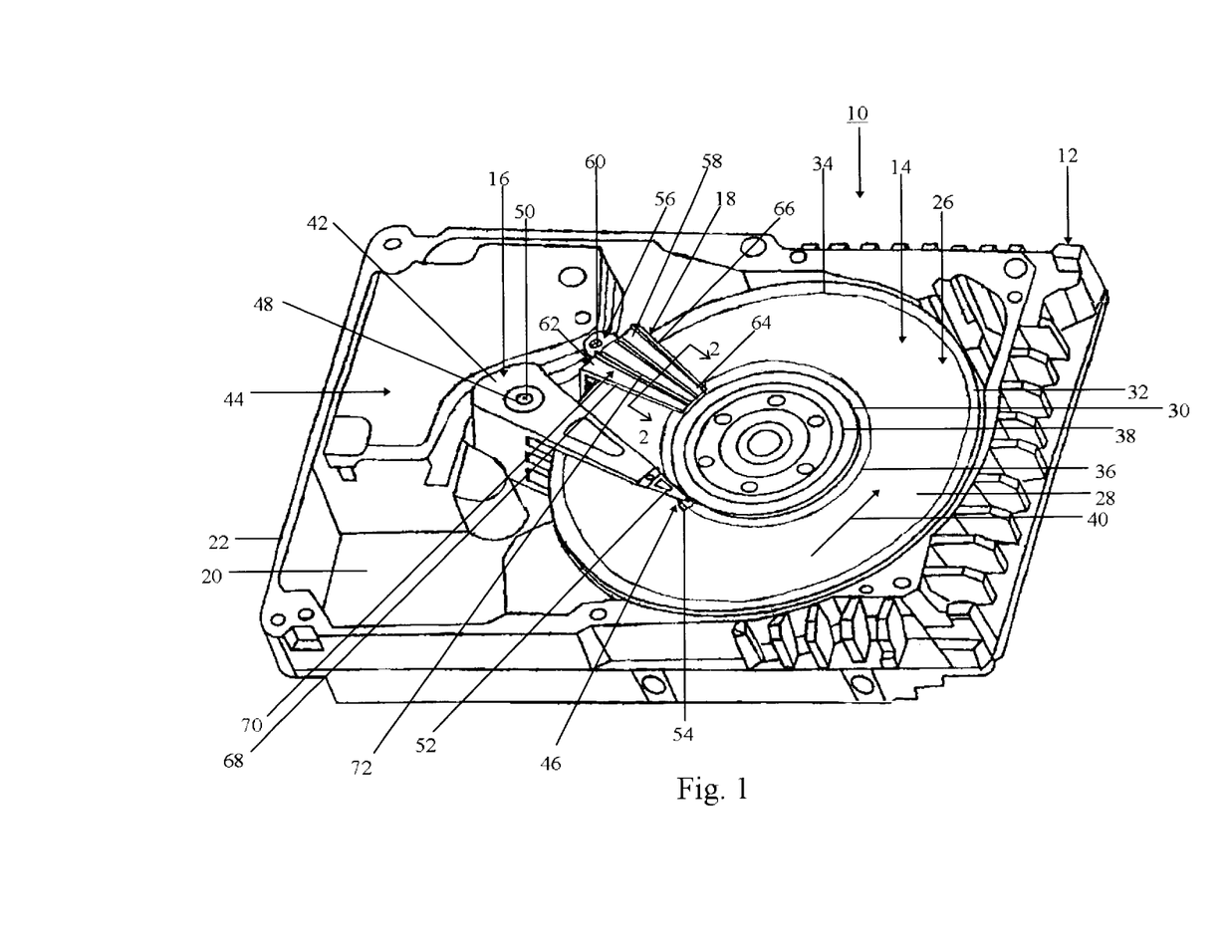
FIG. 1 is a perspective view of a disk drive including a fluid diffuser having features of the present invention.

Referring initially to FIG. 1, a disk drive 10 according to the present invention includes (i) a drive housing 12, (ii) a disk assembly 14, (iii) a head stack assembly 16, and (iv) a fluid diffuser 18. The drive housing 12 retains the various components of the disk drive 10. The drive housing 12 includes a base 20 and four side walls 22. The drive housing 12 also includes a cover 24 (illustrated in FIG. 2) that is spaced apart from the base 20 by the side walls 22.

The disk assembly 14 includes one or more spaced apart, magnetic storage disks 26. Each storage disk 26 includes one or two storage surfaces 28, an inner diameter 30 and an outer diameter 32. Each storage surface 28 can include a plurality of annular shaped concentric data tracks of different radii, including an outer data track 34 and an inner data track 36. The number of storage disks 26 in the disk assembly 14 can be varied to suit the storage requirements of the disk drive 10.

The storage disks 26 are mounted on a disk spindle 38 with a bearing assembly (not shown). A spindle motor (not shown) rotates the disk spindle 38 and the storage disks 26 at a predetermined angular velocity. Rotation of the storage disks 26 generates turbulent fluid flow within the drive housing 12. The storage disks 26 can be rotated in a counterclockwise rotational direction (represented directional arrow 40) or a clockwise rotational direction, as viewed from above the disk drive of FIG. 1.

The head stack assembly 16 includes an E-block 42, a positioner 44, and one or more transducer assemblies 46. The design of these components can be varied to suit the design requirements of the disk drive 10. In FIG. 1, the E-block 42 is mounted to an actuator shaft 48 with a bearing assembly (not shown). The bearing assembly allows the E-block 42 to be rotated relative to the storage disks 26 about a block axis 50.

The positioner 44 precisely moves the E-block 42 and the transducer assemblies 46 relative to the storage disks 26. In FIG. 1, the positioner 44 is a voice coil motor that rotates the E-block 42 and moves the transducer assemblies 46 over the storage surfaces 28 of the storage disks 26.

Each transducer assembly 46 includes a load beam 52, a flexure (not shown) and a slider 54 having a data transducer (not shown). The load beam 52 attaches the flexure and the slider 54 to the E-block 42. The load beam 52 is secured at or near the distal end of the E-block 42 and cantilevers towards the storage disk 26. The load beam 52 is flexible in a direction perpendicular to the storage disk 26 and acts as a spring for supporting the slider 54.

The slider 54 includes one or more fluid bearing surfaces (not shown). In one embodiment, the fluid bearing surface is an air bearing surface. Rotation of the storage disk 26 causes the slider 54 to fly at a predetermined fly height away from the storage disk 26. The fly height of the slider 54 is controlled by many factors, including the rotation speed of the storage disks 26, the design of the fluid bearing surfaces and the design of the load beam 52. As discussed below, the fluid diffuser 18 is not believed to significantly influence maintenance of a consistent fly height during operation of the disk drive.

The positioner 44 moves the data transducer and the slider 54 along an arc shaped transducer path relative to the storage disk 26. The transducer path has a radius that is approximately equal to the distance between the data transducer and the E-block axis 50.

As used herein, the term "downstream side" refers to an area on the storage disks 26 that is just moving away from the transducer path and the slider 54. The term "upstream side" refers to an area of the storage disks 26 that is approaching the transducer path and the slider 54.

The fluid diffuser 18 diffuses high-energy, turbulent fluid flow away from the E-block 42 and the transducer assemblies 46. In the embodiment illustrated in FIG. 1, the fluid diffuser 18 includes a diffuser support 56 and one or more diffuser wings 58 that are secured to the diffuser support 56.

The diffuser support 56 maintains the diffuser wings 58 near the storage disks 26. As illustrated In FIG. 1, the diffuser support 56 can be positioned generally perpendicular to the storage surfaces 28 of the storage disks 26 and adjacent to the outer diameter 32 of the storage disks 26. The diffuser support 56 is secured to the base 20 with a fastener 60. However, other positions and orientations of the diffuser support 56 can be utilized. For example, the diffuser support 56 can be secured to one or more of the side walls 22. The fluid diffuser 18 can be mounted to the drive housing 12 after the disk assembly 14 has been mounted to the drive housing 12, and before or after the head stack assembly 16 has been mounted to the drive housing 12.

In the embodiment illustrated in FIG. 1, the diffuser wings 58 are positioned in relatively close proximity to the transducer assemblies 46, and on the upstream side of the transducer assemblies 46. The design and shape of each diffuser wing 58 can vary depending upon the requirements of the disk drive 10. In FIG. 1, each diffuser wing 58 includes a proximal end 62 that is secured to the diffuser support 56, a distal end 64 positioned away from the diffuser support 56, a leading edge 66, a trailing edge 68, a first wing surface 70 and a second wing surface 71 (illustrated in FIG. 2) that is spaced apart from the first wing surface 70. In this embodiment, the wing surfaces 70, 71 are substantially planar. However, the wing surfaces 70, 71 can alternatively be curved or bowed, in either a concave or a convex configuration relative to the storage disk 26. Still alternatively, the wing surfaces 70, 71 can be shaped in any other suitable configuration.

The leading edge 66 and the trailing edge 68 are positioned so that any particular point on the rotating storage disk 26 will first pass adjacent to the leading edge 66 and then adjacent to the trailing edge 68 of the diffuser wing 58. Further, the trailing edge 68 is positioned closer to the slider 54 of the than the leading edge 66. As referred to herein, the first wing surface 70 of the diffuser wing 58 generally faces away from the storage disk 26, while the second wing surface of each diffuser wing 58 directly faces the nearest storage disk 26.

In FIG. 1, the diffuser wings 58 extend and cantilever from the diffuser support 56 over the storage surfaces 28 of the storage disks 26 from near the outer diameter 32 to near the inner diameter 30 of the storage disks 26. Alternatively, for example, the diffuser wings 58 can extend only partially toward the inner diameter 30 of the storage disks 26.

Further, the shape of each diffuser wing 58 can vary. As shown in FIG. 1, the shape of each diffuser wing 58 can be somewhat trapezoidal. Alternatively, for example, the shape of the diffuser wing 58 can be triangular, rectangular, elliptical, circular, or any other suitable shape.

As provided herein, at least one of the diffuser wings 58 includes one or more surface deviations 72 that disrupt the fluid flow over the wing surfaces 70, 71. The surface deviations 72 are positioned along the first wing surface 70 and/or the second wing surface 71 of the diffuser wing 58. Depending upon the shape of the surface deviations 72, the fluid flow can be directed toward and/or away from the storage disk 26. For example, in the embodiment illustrated in FIG. 1, the surface deviations 72 are shaped and positioned to direct the fluid flow away from the storage disk 26, as explained in greater detail below.

Further, each of the diffuser wings 58 can include any number of surface deviations 72. In the embodiment illustrated in FIG. 1, the top diffuser wing 58 includes three surface deviations 72 that are positioned on the first wing surface 70. However, greater or fewer than three surface deviations 72 can be included on each wing surface 70, 71 of the diffuser wing 58.

Additionally, the shape of each surface deviation 72 can vary. The surface deviation 72 can be any shape, provided the surface deviation 72 structurally deviates from the wing surfaces 70, 71. In the embodiment illustrated in FIG. 1, each surface deviation 72 is a protrusion that has a substantially triangular cross-sectional shape. In alternative embodiments, for example, the surface deviation 72 has a rectangular, semi-circular, or arcuate shaped cross-section. Still alternatively, the surface deviation 72 can have a different cross-sectional shape, or can include more than one cross-sectional shape within a particular surface deviation 72 or among several surface deviations 72. Further, as described below, the surface deviation 72 can be an indentation in the wing surface 70, 71, or an aperture through the diffuser wing 58.

The configuration of the surface deviations 72 on the wing surfaces 70, 71 of the diffuser wing 58 can vary. For example, as shown in FIG. 1, each surface deviation 72 can extend from the proximal end 62 to the distal end 64 of the diffuser wing 58. In an alternative embodiment, the surface deviation 72 extends partially between the proximal end 62 and the distal end 64. In another embodiment, the surface deviation 72 extends intermittently along the first wing surface 70 and/or the second wing surface 71 of the diffuser wing 58. The surface deviation 72 can have a specific pattern on the first wing surface 70 and/or the second wing surface 71 of the diffuser wing 58. Alternatively, the surface deviation 72 can have a pattern that is semi-random, e.g. a random pattern that is repeated. Still alternatively, the fluid diffuser 72 can have a completely random configuration along the first wing surface 70 and/or the second wing surface 71 of the diffuser wing 58.

With this design, fluid flow generated by rotation of the storage disks 26 impacts the diffuser wings 58 prior to reaching the E-block 42 and transducer assemblies 46. Thus, the fluid flow is disrupted, causing a decreased fluid velocity near the storage surfaces 28 of the storage disks 26. Decreased fluid velocity results in a reduced fluid disturbance near the transducer assemblies 46. Consequently, the incidence of track misregistration due to the high velocity of fluid is decreased and greater accuracy in the transfer of data between the transducer assembly 46 and the storage disk 26 can be achieved.

The construction of and the materials used in the fluid diffuser 18 can vary. For example, for ease of manufacturing, the diffuser support 56 and the diffuser wings 58 can be made as an integral structure that is molded, cast or machined. Alternately, the diffuser support 56, the diffuser wings 58, and/or the surface deviations 72 can be manufactured separately and assembled together. The fluid diffuser 18 can be constructed from plastics, lightweight metals, ceramics, reinforced composites or other materials. Moreover, the external surfaces of the fluid diffuser 18 can be textured or coated to increase or reduce aerodynamic drag, as necessary.

Figure 2:
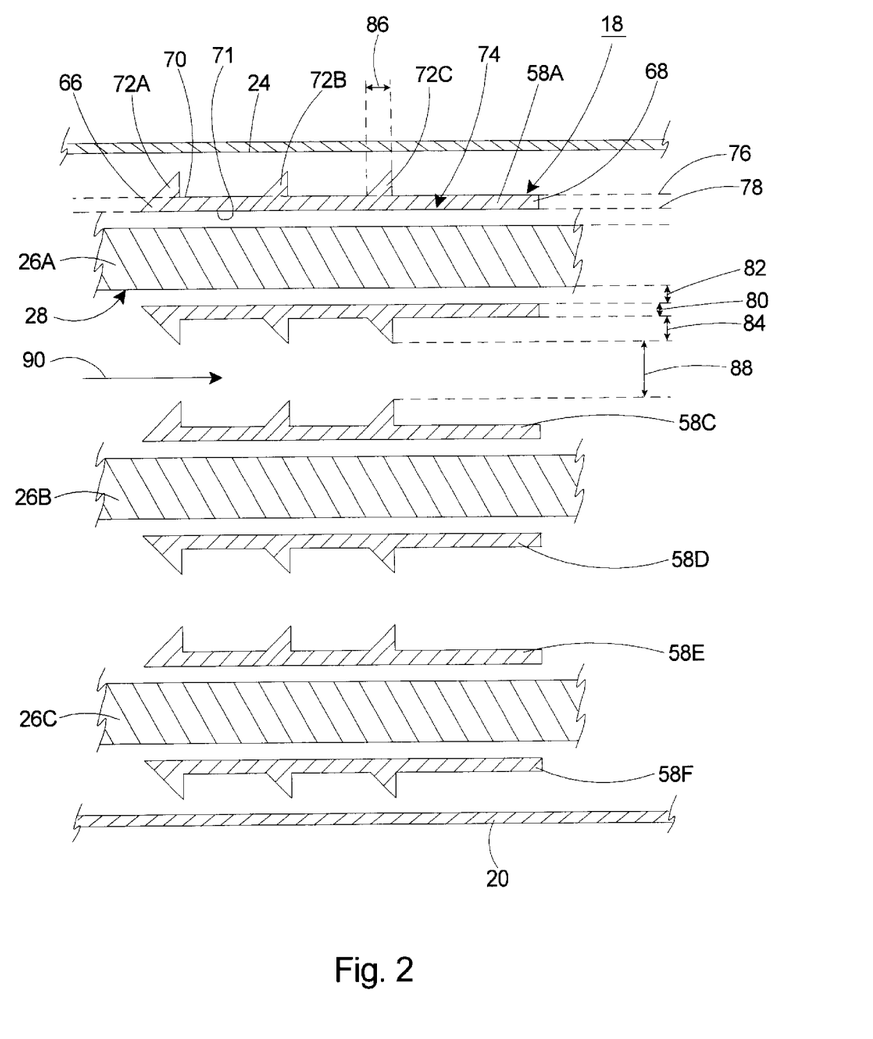
FIG. 2 is a partial cross-sectional view taken on line 2—2 in FIG. 1 including a cover.

FIG. 2 is a partial cross-sectional view of the fluid diffuser 18 and the storage disks 26 illustrated in FIG. 1. FIG. 2 illustrates a first storage disk 26A, a second storage disk 26B and a third storage disk 26C. The fluid diffuser 18 includes a first upper diffuser wing 58A, a first lower diffuser wing 58B, a second upper diffuser wing 58C, a second lower diffuser wing 58D, a third upper diffuser wing 58E and a third lower diffuser wing 58F.

The number of diffuser wings 58A–F can vary depending upon the number of storage disks 26A–C and the number of transducer assemblies 46 (illustrated in FIG. 1). In the embodiment illustrated in FIG. 2, two of the diffuser wings 58A–F are positioned between each pair of storage disks 26A–C. Stated another way, a separate diffuser wing 58A–F is positioned near each side of the storage disk 26A–C. In an alternative embodiment, a single diffuser wing can be positioned between each pair of storage disks. Still alternatively, greater than two diffuser wings can be positioned between each pair of storage disks.

In the embodiment illustrated in FIG. 2, the first lower diffuser wing 58B and the second upper diffuser wing 58C are positioned between the first storage disk 26A and the second storage disk 26B. Somewhat similarly, the second lower diffuser wing 58D and the third upper diffuser wing 58E are positioned between the second storage disk 26B and the third storage disk 26C. Further, the first upper diffuser wing 58A is positioned between the first storage disk 26A and the cover 24. The third lower diffuser wing 58F is positioned between the third storage disk 26C and the base 20.

Each diffuser wing 58A–F includes a wing body 74 and one or more of the surface deviations including a first surface deviation 72A, a second surface deviation 72B and a third surface deviation 72C. The wing body 74 includes the first wing surface 70 and the second wing surface 71. The first wing surface 70 lies in a first surface plane 76 (illustrated in phantom on the first upper diffuser wing 58A in FIG. 2). The second wing surface 71 lies in a second surface plane 78 (illustrated in phantom first upper diffuser wing 58A in FIG. 2).

The wing body 74 has a body thickness 80 that can vary. In one embodiment, the body thickness 80 is approximately 0.15 millimeters. However, in alternative embodiments, the body thickness 80 can be greater or less than 0.15 millimeters. Additionally, a spacing 82 between the wing body 74 and the storage disk 26A vary. In one embodiment, the spacing 82 can be approximately 0.15 millimeters. In alternative embodiments, the spacing 82 can be greater or less than 0.15 millimeters.

With this spacing 82, the diffuser wings 58A–F do not redirect or divert all of the fluid flow away from the transducer assemblies 46 (illustrated in FIG. 1). As a result thereof, the diffuser wings 58A–F are believed to not significantly influence the flying height of the sliders 54 (illustrated in FIG. 1). However, the diffuser wings 58A–F reduce the fluid turbulence that is experienced by the load beams 52 (illustrated in FIG. 1) and the E-block 42 (illustrated in FIG. 1). This reduces lateral flexing of the load beams 52 and the E-block 42 and the positioner 44 (illustrated in FIG. 1) can accurately position and maintain positioning of the slider 54.

In the embodiment illustrated in FIG. 2, the surface deviations 72A–C are positioned along the first wing surface 70 of the wing body 74. The surface deviations 72A–C can be separately formed and attached to the wing body 74, or the surface deviations 72A–C can be integrally formed with the wing body 74. In this embodiment, the first surface deviation 72A is positioned near the leading edge 66 of the diffuser wing 58A. The third surface deviation 72C is positioned between the first surface deviation 72A and the trailing edge 68. The second surface deviation 72B is positioned between the first surface deviation 72A and the third surface deviation 72C. However, the surface deviations 72A–C can be positioned in any suitable location along the wing body 74.

The surface deviations 72A–C can have a disrupter height 84 (illustrated near the surface deviation 72C of the first lower diffuser wing 58B) and a disrupter width 86 (illustrated near surface deviation 72C of the first upper diffuser wing 58A). In this embodiment, the disrupter height 84 is the height of the surface deviation 72C from the wing surface 70 in a direction that is substantially perpendicular to the storage surface 28 of the storage disk 26. For example, the disrupter height 84 can be approximately 0.30 millimeters. In alternate embodiments, the disrupter height 84 can be greater or less than 0.30 millimeters. For example, the disrupter height 84 can be approximately 0.10, 0.20, 0.40 or 0.50 millimeters.

Further, the disrupter width 86 is the width of the surface deviation 72C along the wing surface 70. For example, the disrupter width 86 can be approximately 0.30 millimeters. In alternate embodiments, the disrupter width 86 can be greater or less than 0.30 millimeters. For example, the disrupter width 86 can be approximately 0.10, 0.20, 0.40 or 0.50 millimeters.

Moreover the ratio of the disrupter height 84 to the disrupter width 86 can vary. For example, in one embodiment, the ratio of the of the disrupter height 84 to the disrupter width 86 is approximately 1:1. In alternate embodiments, the ratio of the disrupter height 84 to the disrupter width 86 is 0.20, 0.25, 0.40, 0.50, 0.80, 1.25, 2.00, 2.50, 4.00 or 5.00, as non-exclusive examples.

Further, the fluid diffuser 18 has an interdisrupter distance 88, e.g. the distance between the surface deviation 72C positioned on the first wing surface 70 of the first lower diffuser wing 58B to a facing surface deviation 72C positioned on an adjacent first wing surface 70 of the second upper diffuser wing 58C, which can vary. In the embodiment illustrated in FIG. 2, the interdisrupter distance 88 can be approximately 0.80 millimeters. In alternate embodiments, the interdisrupter distance 88 can be any suitable distance greater or less than 0.80 millimeters.

In this example, the storage disks 26A–C are rotating in the direction of directional arrow 90 relative to the fluid diffuser 18. As a result, fluid flow generally moves in a similar direction as the storage disks 26A–C within the disk drive 10. Thus, fluid flow first contacts the leading edge 66 of each diffuser wing 58A–F. The fluid flow then moves across the diffuser wings 58A–F toward the trailing edge 68 of each diffuser wing 58A–F.

As illustrated in the embodiment in FIG. 2, the leading edge 66 of each diffuser wing 58A–F can be angled so that the leading edge 66 is somewhat wedge-shaped relative to the disk surface 28. For example, the first surface deviation 72A positioned at the leading edge 66 of the second lower diffuser wing 58D forces fluid flow along the angle, away from the storage disk 26B. With this design, a portion of the fluid flow is urged away from the storage disk 26B as the fluid first contacts the second lower diffuser wing 58D. As the fluid continues to move over the diffuser wing 58D, the fluid encounters the second and third surface deviations 72B, 72C, which further force the fluid away from the storage disk 26B. Because the fluid flow has been disrupted from its normal flow which is substantially parallel to the disk surface 28, the velocity of the fluid is decreased after the fluid passes the fluid diffuser 18. Importantly, although the surface deviations 72A–C in this embodiment force fluid away from the storage disk 26B, the fluid diffuser 18 provided herein can alternately force fluid toward the storage disk 26B, as described in greater detail below.

Moreover, the specific angle of the surface deviations 72A–C relative to the wing surface 70, 71 can vary. In the embodiment illustrated in FIG. 2, the angle is approximately 135 degrees. In alternate embodiments, the angle can be approximately 15, 30, 45, 60, 75, 90, 105, 120, 150 or 165 degrees relative to the wing surface 70, 71. Still alternately, the surface deviations 72A–C can form a concave or a convex curve with the wing surface 70, 71. In yet another embodiment, the configuration of each surface deviation 72A–C can be different than each of the other surface deviations 72A–C.

Additionally, the surface deviations 72A–C can extend away from the wing surfaces 70, 71 in a direction that is toward or away from one of the storage disks. For example, the first lower diffuser wing 58B includes surface deviations 72A–C that extend away from the first storage disk 26A. However, the surface deviations extend toward the second storage disk 26B. As described in greater detail below, the surface deviations 72A–C can include indentations in the wing surfaces 70, 71, rather than the protrusions illustrated in FIG. 2. With this design, the surface deviations 72A–C that include indentations can extend in an opposite direction from the surface deviations 72A–C that are protrusions. Thus, for example, one of the diffuser wings 58B, 58C that is positioned between two adjacent storage disks 26A, 26B can include surface deviations 72A–C that extend toward and/or away from either of the storage disks 26A, 26B.

Figure 3A:
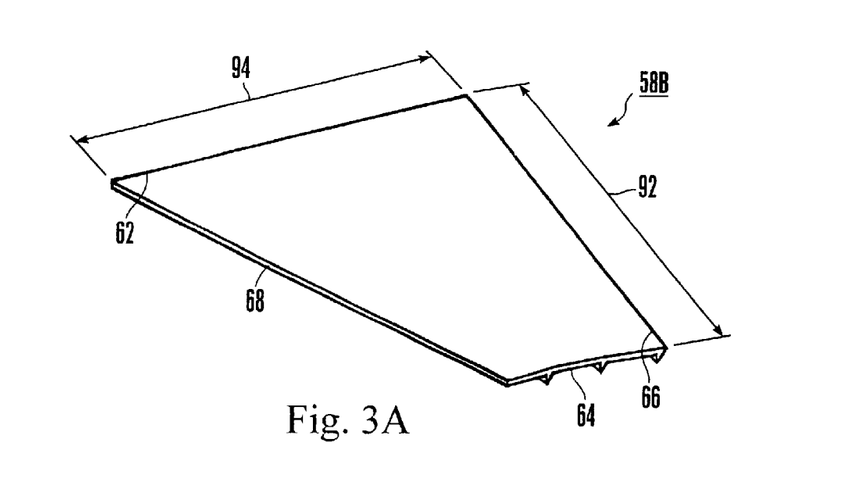
FIG. 3A is a top perspective view of a portion of an embodiment of the fluid diffuser.
Figure 3B:
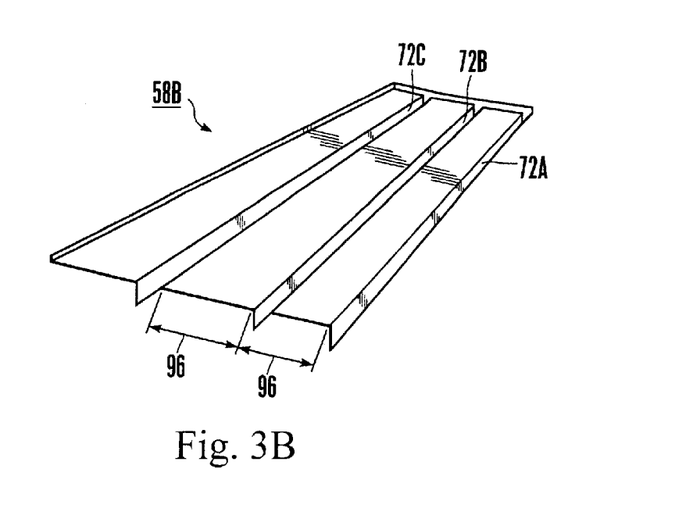
FIG. 3B is a bottom perspective view of the fluid diffuser in FIG. 3A.

FIG. 3A illustrates a top perspective view and FIG. 3B illustrates a bottom perspective view of one of the diffuser wings 58B of the fluid diffuser illustrated in FIG. 2. The diffuser wing 58B in this embodiment is somewhat trapezoidal or fan shaped. The diffuser wing 58B has a wing length 92, measured between the proximal end 62 and the distal end 64, and a wing width 94, measured from the leading edge 66 to the trailing edge 68. In this design, a suitable wing length 92 of the diffuser wing 58B between the ends 62, 64 is the approximate distance between the inner track and the outer track of the storage disk (illustrated in FIG. 1), or approximately between 1.0 and 1.2 inches for a 3.5 inch storage disk, although the wing length 92 can be greater or less than this length.

A suitable wing width 94 can vary along the wing length 92. For example, near the distal end 64, the wing width 94 can be between zero and 0.5 inches. Near the proximal end 62, the wing width 94 can be between approximately 0.1 and 1.0 inches, although the wing widths 94 provided can vary widely depending upon the design requirements of the disk drive 10. Further, the proximal end 62 and/or the distal end 64 of the diffuser wing 58B can be linear or arc-shaped, as non-exclusive examples. Moreover, as illustrated in FIG. 3B, a distance 96 between the surface deviations 72A–C on the same diffuser wing 58B can vary. Additionally, although the surface deviations 72A–C illustrated in FIG. 3B are substantially linear, the surface deviations 72A–C can alternatively be curved. Further, although the surface deviations 72A–C in FIG. 3B are positioned on a substantially planar wing surface 70, the surface deviations 72A–C can alternately be positioned on a curved wing surface 70.

Figure 4:
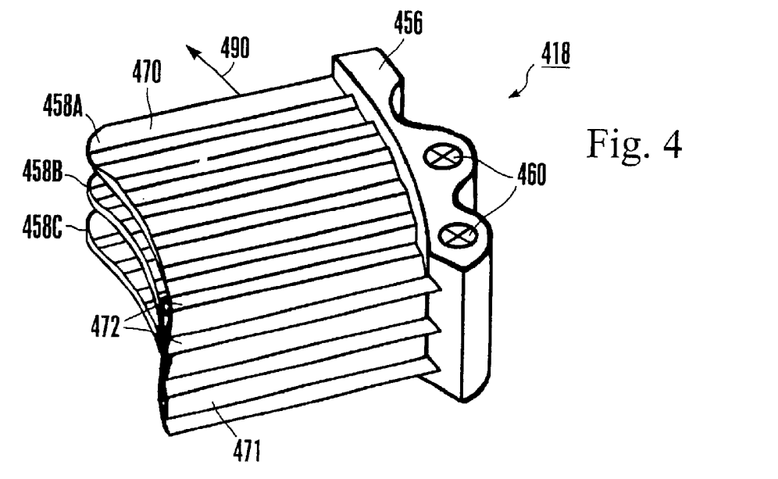
FIG. 4 is a perspective view of another embodiment of the fluid diffuser.

FIG. 4 illustrates another embodiment of a fluid diffuser 418 including a diffuser support 456 and a plurality of diffuser wings including a first diffuser wing 458A, a second diffuser wing 458B and a third diffuser wing 458C that cantilever from the diffuser support 456. The diffuser support 456 can be secured to the drive housing 12 (illustrated in FIG. 1) using one or more fasteners 460. The diffuser support 456 illustrated in FIG. 4 is shaped to accommodate various components within the disk drive 10. However, any suitable shape can be used for the diffuser support 456. In this embodiment, the diffuser wings 458A–C are separately formed and secured to the diffuser support 456. Alternately, the diffuser support 456 and the diffuser wings 458A–C can be integrally formed. Rotation of the storage disks (omitted from FIG. 4 for clarity) with the fluid diffuser 418 provided herein can be in the direction of directional arrow 490 indicated in FIG. 4. The positioning of the fluid diffuser 418 relative to the transducer assemblies 46 (illustrated in FIG. 1) can vary.

In this embodiment, only one diffuser wing 458A–C is positioned between each pair of storage disks. The shape of the diffuser wings 458A–C can vary to suit the design requirements of the disk drive 10. In this embodiment, the diffuser wings 458A–C are somewhat arc-shaped to follow the contour of the storage disks. The fluid diffuser 418 can include one or more surface deviations 472 on the first wing surface 470 and the second wing surface 471 of each diffuser wing 458A–C. The surface deviations 472 in this embodiment can be shaped and sized similarly to those described herein. For example, the surface deviations 472 can be protrusions, apertures or indentations. In this embodiment, the fluid flow is directed by the surface deviations 472 toward the storage disks. However, because the flow of the fluid caused by the rotating storage disks is disrupted and/or redirected by the surface deviations 472, the velocity of the fluid between the storage disks is slowed.

Figure 5:
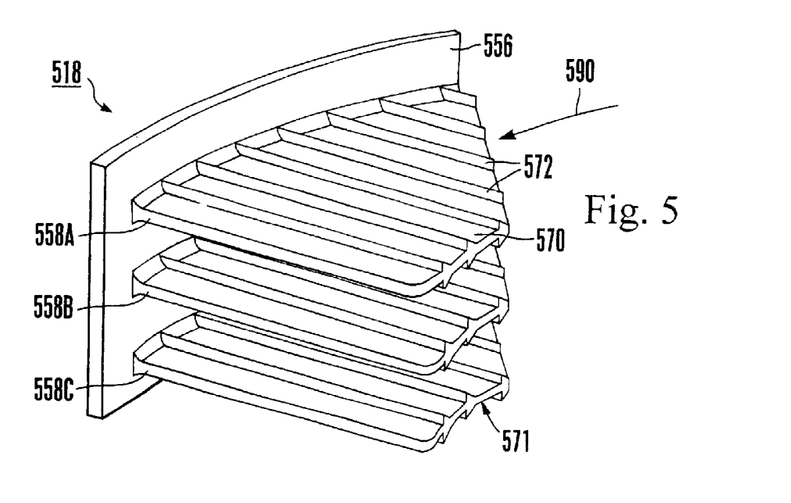
FIG. 5 is a perspective view of yet another embodiment of the fluid diffuser.

FIG. 5 illustrates still another embodiment of the fluid diffuser 518 including the diffuser support 556 and a plurality of diffuser wings including a first diffuser wing 558A, a second diffuser wing 558B and a third diffuser wing 558C that cantilever from the diffuser support 556. The diffuser support 556 is secured to the drive housing 12 (illustrated in FIG. 1) as previously provided herein. Further, in this embodiment, the diffuser support 556 is somewhat rectangular and curved to follow the contour of the outer diameter of the storage disks (illustrated in FIG. 1). Rotation of the storage disks with the fluid diffuser 518 provided herein can be in the direction of directional arrow 590 indicated in FIG. 5.

In this embodiment, only one of the diffuser wings 558A–C is positioned between each pair of storage disks. The shape of the diffuser wings 558A–C can vary to suit the design requirements of the disk drive 10. In this embodiment, the diffuser wings 558A–C are somewhat trapezoidal. The fluid diffuser includes surface deviations 572 on the first wing surface 570 and the second wing surface 571 of each of the diffuser wings 558A–C. The surface deviations 572 in this embodiment can be shaped and sized similarly to those described herein. For example, the surface deviations 572 can be protrusions, apertures or indentations.

Figure 6:
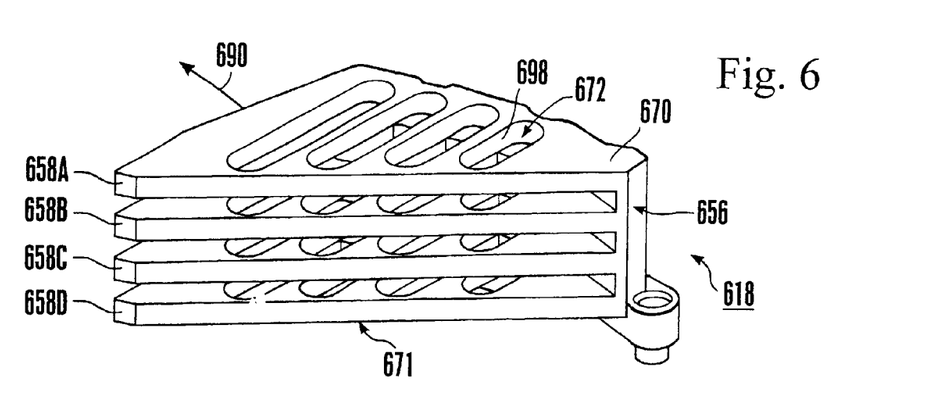
FIG. 6 is a perspective view of still another embodiment of the fluid diffuser.

FIG. 6 illustrates yet another embodiment of the fluid diffuser 618 including the diffuser support 656 and a plurality of diffuser wings including a first diffuser wing 658A, a second diffuser wing 658B, a third diffuser wing 658C and a fourth diffuser wing 658D that cantilever from the diffuser support 656. The diffuser support 656 is secured to the drive housing 12 (illustrated in FIG. 1) as previously provided herein. Rotation of the storage disks (illustrated in FIG. 1) with the fluid diffuser 618 provided herein can be in the direction of directional arrow 690 indicated in FIG. 6.

In this embodiment, only one of the diffuser wings 658A–D is positioned between each pair of storage disks. The shape of the diffuser wings 658A–D can vary to suit the design requirements of the disk drive 10. In this embodiment, the diffuser wings 658A–D are somewhat triangular.

Further, the fluid diffuser 618 includes surface deviations 672 on each of the diffuser wings 658A–D. In this embodiment, the surface deviations 672 are slots or apertures that extend through the diffuser wings 658A–D. Each surface deviation 672 includes a disrupter wall 698 that surrounds the aperture. The shape of the surface deviations 672 can be varied. As illustrated in FIG. 6, the surface deviations 672 can be somewhat elliptical. However, any suitably shaped aperture can be used for the surface deviations 672.

As the fluid flows over the diffuser wings 658A–D, a portion of the fluid impacts the disrupter wall 698 and is disrupted from normal flow within the disk drive 10. This disruption results in lower velocity of the fluid during rotation of the storage disks.

Figure 7:
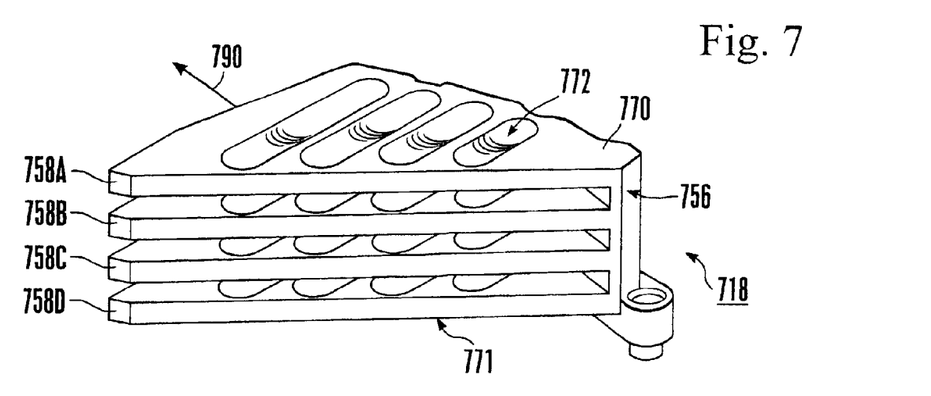
FIG. 7 is a perspective view of another embodiment of the fluid diffuser.

FIG. 7 illustrates still another embodiment of the fluid diffuser 718 including, the diffuser support 756 and a plurality of diffuser wings including a first diffuser wing 758A, a second diffuser wing 758B, a third diffuser wing 758C and a fourth diffuser wing 758D that cantilever from the diffuser support 756. The diffuser support 756 is secured to the drive housing 12 (illustrated in FIG. 1) as previously provided herein. Rotation of the storage disks (illustrated in FIG. 1) with the fluid diffuser 718 provided herein can be in the direction of directional arrow 790 indicated in FIG. 7.

In this embodiment, only one of the diffuser wings 758A–D is positioned between each pair of storage disks. The shape of the diffuser wings 758A–D can vary to suit the design requirements of the disk drive 10. In this embodiment, the diffuser wings 758A–D are somewhat triangular.

Further, the fluid diffuser 718 includes surface deviations 772 on each of the diffuser wings 758A–D. In this embodiment, the surface deviations 772 are indentations in the first wing surface 770 and/or second wing surface 771 of the diffuser wings 758A–D, and do not completely extend through the diffuser wings 758A–D. The shape of the surface deviations 772 can be varied. As illustrated in FIG. 7, the surface deviations 772 can be somewhat elliptical. However, any suitably shaped indentation can be used for the surface deviations 772.

As the fluid flows over the diffuser wings 758A–D, the fluid is disrupted from its normal flow within the disk drive

10. This disruption results in lower velocity of the fluid during rotation of the storage disks.

While the particular fluid diffuser 18 and disk drive 10, as herein shown and disclosed in detail, is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A disk drive comprising:
   a drive housing;
   a rotating first storage disk coupled to the drive housing, the first storage disk having a first storage surface, the rotating first storage disk generating fluid flow; and
   a fluid diffuser that is coupled to the drive housing, the fluid diffuser including a first diffuser wing that is substantially stationary relative to the drive housing, the first diffuser wing having a first wing surface positioned near the first storage surface, the first diffuser wing including a surface deviation that is positioned along the first wing surface, the surface deviation disrupting the fluid flow over the first wing surface.

2. The disk drive of claim 1 wherein the surface deviation extends from the first wing surface toward the first storage surface.

3. The disk drive of claim 1 wherein the surface deviation includes an indentation into the first wing surface of the first diffuser wing.

4. The disk drive of claim 1 wherein the surface deviation includes an aperture that extends through the first diffuser wing.

5. The disk drive of claim 1 wherein the fluid diffuser includes a plurality of surface deviations that are positioned along the first wing surface.

6. The disk drive of claim 5 wherein first storage disk has a disk center, and wherein at least two of the surface deviations are positioned substantially radially relative to the disk center.

7. The disk drive of claim 5 wherein at least two of the surface deviations are substantially parallel to each other.

8. The disk drive of claim 1 wherein the surface deviation has a substantially triangular cross-section.

9. The disk drive of claim 1 further comprising a rotating second storage disk that is spaced apart from the first storage disk, wherein the first diffuser wing is positioned substantially between the first storage disk and the second storage disk.

10. The disk drive of claim 1 wherein the first storage disk includes a second storage surface, and wherein the fluid diffuser includes a second diffuser wing having a second wing surface that is positioned near the second storage surface.

11. The disk drive of claim 1 further comprising a rotating second storage disk that is spaced apart from the first storage disk, wherein the fluid diffuser includes a plurality of diffuser wings, and wherein at least two of the diffuser wings are positioned substantially between the first storage disk and the second storage disk.

12. The disk drive of claim 1 further comprising a slider that is coupled to the drive housing, and wherein the fluid diffuser is positioned substantially on an upstream side of the slider.

13. The disk drive of claim 1 wherein the first diffuser wing diverts the fluid flow substantially toward the first storage surface.

14. The disk drive of claim 1 wherein the first diffuser wing diverts the fluid flow substantially away from the first storage surface.

15. The disk drive of claim 1 wherein the first storage disk includes an inner data track and an outer data track and the first diffuser wing extends between approximately the inner data track and the outer data track.

16. The disk drive of claim 15 wherein the surface deviation extends between approximately the inner data track and the outer data track.

17. The disk drive of claim 1 wherein the fluid diffuser is formed as a unitary structure.

18. The disk drive of claim 1 wherein the drive housing includes a cover, and wherein the first diffuser wing is positioned substantially between the first storage disk and the cover.

19. The disk drive of claim 1 wherein the drive housing includes a base, and wherein the first diffuser wing is positioned substantially between the first storage disk and the base.

20. A disk drive comprising:
    a rotating storage disk that generates fluid flow, the storage disk having a storage surface; and
    a fluid diffuser including a diffuser wing having a wing surface, the diffuser wing being positioned adjacent to the storage surface, the diffuser wing including a surface deviation that is positioned along the wing surface, the surface deviation extending away from the wing surface toward the storage surface.

21. The disk drive of claim 20 wherein the wing surface is substantially planar.

22. The disk drive of claim 20 wherein the wing surface is substantially parallel to the storage surface of the storage disk.

23. The disk drive of claim 20 wherein the wing surface is substantially curved.

24. The disk drive of claim 20 wherein the surface deviation has a substantially triangular cross-section.

25. The disk drive of claim 20 wherein a portion of the surface deviation forms an angle with the wing surface that is greater than approximately 0 degrees and less than approximately 180 degrees.

26. The disk drive of claim 20 wherein a portion of the surface deviation forms an angle with the wing surface that is greater than approximately 105 degrees and less than approximately 165 degrees.

27. A disk drive comprising:
    a pair of spaced apart, rotating storage disks that generate fluid flow, each storage disk having a storage surface; and
    a fluid diffuser including a diffuser wing having a wing surface, the diffuser wing being positioned between the storage surfaces of the storage disks, the diffuser wing including a surface deviation that extends from the wing surface toward one of the storage surfaces.

28. The disk drive of claim 27 wherein the wing surface is substantially planar.

29. The disk drive of claim 27 wherein the wing surface is substantially parallel to the storage surface of the storage disk.

30. The disk drive of claim 27 wherein the wing surface is substantially curved.

31. The disk drive of claim 27 wherein a portion of the surface deviation forms an angle with the wing surface that is greater than approximately 0 degrees and less than approximately 180 degrees.

32. A method for enhancing the reliability of a disk drive, the disk drive having a rotating storage disk that includes a first storage surface, the method comprising the steps of:

positioning a first diffuser wing near the first storage surface, the first diffuser wing having a first wing surface; and positioning a surface deviation along the first wing surface, the surface deviation disrupting fluid flow over the first wing surface.

33. The method of claim 32 wherein the step of positioning the surface deviation includes positioning the surface deviation so that the fluid flow is at least partially directed toward the first storage surface.

34. The method of claim 32 wherein the step of positioning the surface deviation includes positioning the surface deviation so that the fluid flow is at least partially directed away from the first storage surface.

35. A disk drive comprising:

a drive housing;

a rotating first storage disk coupled to the drive housing, the first storage disk having a first storage surface;

an adjacent rotating second storage disk that is spaced apart from the first storage disk, at least one of the storage disks generating fluid flow during rotation; and a fluid diffuser that is coupled to the drive housing, the fluid diffuser including a first diffuser wing and a second diffuser wing that are positioned substantially between the first storage disk and the second storage disk, one of the diffuser wings including a first surface deviation that disrupts the fluid flow near one of the storage disks.

36. The disk drive of claim 35 wherein the first surface deviation is positioned along the first diffuser wing, and wherein the second diffuser wing includes a second surface deviation that disrupts the fluid flow near one of the storage disks.

37. The disk drive of claim 35 wherein the first diffuser wing is positioned substantially between the second diffuser wing and one of the storage disks.

38. A disk drive comprising:

a drive housing;

a rotating storage disk that is coupled to the drive housing, the storage disk including a storage surface having an inner data track and an outer data track, the storage disk generating fluid flow during rotation; and a fluid diffuser that is coupled to the drive housing, the fluid diffuser including a first diffuser wing that is positioned near the storage surface and is substantially stationary relative to the drive housing, the first diffuser wing including a first surface deviation that extends substantially between the inner data track and the outer data track of the storage disk, the first surface deviation disrupting the fluid flow near the storage surface.

39. The disk drive of claim 38 wherein the first surface deviation includes an indentation into the first diffuser wing.

40. The disk drive of claim 38 wherein the first surface deviation includes an aperture that extends through the first diffuser wing.

41. The disk drive of claim 38 wherein the storage disk has a disk center, and wherein the first surface deviation extends approximately radially relative to the disk center.

42. The disk drive of claim 38 wherein the first diffuser wing includes a second surface deviation, and wherein the first surface deviation and the second surface deviation are substantially parallel to each other.

43. The disk drive of claim 38 wherein the first surface deviation has a substantially triangular cross-section.

44. The disk drive of claim 38 further comprising a slider that is coupled to the drive housing, and wherein the fluid diffuser is positioned substantially on an upstream side of the slider.

45. The disk drive of claim 38 wherein the first diffuser wing diverts the fluid flow substantially toward the storage surface.

46. The disk drive of claim 38 wherein the first diffuser wing diverts the fluid flow substantially away from the storage surface.

47. The disk drive of claim 38 wherein the drive housing includes a cover, and wherein the first diffuser wing is positioned substantially between the storage disk and the cover.

48. The disk drive of claim 38 wherein the drive housing includes a base, and wherein the first diffuser wing is positioned substantially between the storage disk and the base.

49. A method for enhancing the reliability of a disk drive, the method comprising the steps of:

positioning a first diffuser wing and a second diffuser wing of a fluid diffuser between a first rotatable storage disk and an adjacent second rotatable storage disk, one of the diffuser wings including a first surface deviation;

generating fluid flow from rotation of at least one of the storage disks; and disrupting the fluid flow near at least one of the storage disks with the surface deviation.

50. The method of claim 49 wherein the step of positioning includes positioning the first surface deviation along the first diffuser wing, and positioning a second surface deviation along the second diffuser wing, the second surface deviation disrupting fluid flow near at least one of the storage disks.

51. The method of claim 49 wherein the step of disrupting includes decreasing the velocity of the fluid that is generated by rotation of at least one of the storage disks with the first surface deviation.

* * * * *